(12) United States Patent
Haffner

(10) Patent No.: US 7,818,455 B2
(45) Date of Patent: Oct. 19, 2010

(54) ALIAS MANAGEMENT PLATFORMS AND METHODS

(75) Inventor: Crosby Haffner, Glendale, CA (US)

(73) Assignee: Tactara, LLC, Los Angeles, CA (US)

( * ) Notice: Subject to any disclaimer, the term of this patent is extended or adjusted under 35 U.S.C. 154(b) by 0 days.

(21) Appl. No.: 12/636,097

(22) Filed: Dec. 11, 2009

(65) Prior Publication Data

US 2010/0077053 A1 Mar. 25, 2010

Related U.S. Application Data

(63) Continuation-in-part of application No. 12/537,454, filed on Aug. 7, 2009.

(60) Provisional application No. 61/087,126, filed on Aug. 7, 2008.

(51) Int. Cl.
*G06F 15/16* (2006.01)
(52) U.S. Cl. ............... 709/245; 709/203; 709/206; 709/217; 709/219; 707/706; 707/723
(58) Field of Classification Search ................. 709/245, 709/203, 206, 217, 219; 707/706, 723
See application file for complete search history.

(56) References Cited

U.S. PATENT DOCUMENTS

| 5,990,886 | A | 11/1999 | Serdy et al. |
| 6,473,758 | B1 * | 10/2002 | Schwartz et al. .................. 1/1 |
| 7,120,927 | B1 | 10/2006 | Beyda et al. |
| 7,231,428 | B2 | 6/2007 | Teague |
| 7,359,493 | B1 * | 4/2008 | Wang et al. ............... 379/88.23 |
| 2004/0249831 | A1 * | 12/2004 | Fagin et al. ................. 707/100 |
| 2005/0204011 | A1 | 9/2005 | Velayudham |
| 2006/0026145 | A1 * | 2/2006 | Beringer et al. ................ 707/3 |
| 2008/0301238 | A1 * | 12/2008 | Elbers ........................ 709/206 |

* cited by examiner

*Primary Examiner*—Joseph Thomas
*Assistant Examiner*—Andrew Georgandellis
(74) *Attorney, Agent, or Firm*—Fish & Associates, PC

(57) ABSTRACT

Systems and methods of managing aliases are disclosed. An alias management system can be configured to offer access to one or more aliases that point to distribution lists, where aliases can be managed as distinct objects relative to distributions lists or addresses. An alias user can submit desirable criteria for content distribution chain that includes properties of a desirable alias. An alias management server can be used to identify distributions lists that satisfy at least some of the desirable criteria. Additionally, an alias can be created that adheres to at least some of the properties or attributes of the desirable alias. Alias users can be permitted to utilize the alias subject to any rules or polices in place.

20 Claims, 12 Drawing Sheets

Alias User Interface
(Web Interface)
770

Address: http://www.alias-r-us.com/user?=ZC#3

Welcome to Alias-R-Us 780
Criteria: Price < $50; term <= 2 weeks; etc.

Aliases Ranked by Alias Attributes
791

| Rank | Price | Term (days) | Etc. |
|------|-------|-------------|------|
| 1 | $55 | 21 | ... |
| 2 | $53 | 15 | |
| 3 | $48 | 14 | |
| 4 | $20 | 7 | |
| 5 | $20 | 7 | |
| 6 | $18 | 5 | |
| Etc. | ... | ... | |
| N | | | |

Alias Policy for #3
793

| Condition | Value |
|-----------|-------|
| Price | $48 |
| Start Date | 14-NOV |
| End Date | 21-NOV |
| Transferable | No |
| Sellable | No |
| Max Uses | 100K |
| Current Uses | 54,392 |
| Authorized User | Xyz.com |
| Etc. | |

[Purchase]  [Cancel]

Figure 7B

ALIAS MANAGEMENT PLATFORMS AND METHODS

This application is a continuation-in-part of U.S. patent application having Ser. No. 12/537,454 filed on Aug. 7, 2009, which claims the benefit of priority to U.S. provisional application having Ser. No. 61/087,126 filed on Aug. 7, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is electronic messaging technologies.

BACKGROUND

When a party, such as a consumer, provides its address (e.g., an email address) typically with permission to use that address, to a third party (an "Advertiser"), it's rare that the Advertiser will be the only party involved in delivering information to such a consumer. Generally, Advertisers distribute their consumer addresses to one or more members of a distribution chain involved in delivering messaging on behalf of the Advertiser. A consumer's address is vulnerable to all the risks inherent in exposed information—once disclosed, the information cannot be retrieved or "taken back", and there is no audit trail or other method for determining how such information travels from one party to another.

For example, if a consumer's address falls into the hands of a third party who is not authorized to use it, there is no method for the Advertiser to prevent the unauthorized party from using such information. Similarly, there is no way for the Advertiser to determine how the information was leaked (e.g., a systems security breach, theft, insecure information storage, faulty business practices, deliberate sale or transfer of the information, etc) or to determine which of its vendors is responsible for the problem. Worst of all, the Advertiser has lost control of one of its most valuable assets—the trusted permissions of its customers and prospective customers, and the associated consumer's addresses. Loss of control of this valuable information results in a dilution of the value of the Advertiser's consumer addresses, a potentially irrecoverable loss of trust between the consumer and the Advertiser, and a potential increase in spam and headaches for the consumer. As consumers become more sophisticated, and more sensitive to the relevance of the messaging they receive, it is critical that owners of distribution addresses or list of addresses have the ability to effectively protect and manage how their address lists are managed and used.

An overview of the problems associated with unsolicited messages, and possible solutions, can be found in the paper titled "Fighting Spam by Encapsulating Policy in Email Addresses" by John Ioannidis, presented at Proceedings of the Network and Distributed System Security Symposium, NDSS 2003, San Diego, Calif., USA 2003.

Much effort has been directed toward protecting actual addresses from undesirable exposure. To date, most effort has focused on using address aliases to protect addresses of a message recipient or a message sender. For example, U.S. patent application publication 2007/0180039 to Sutidze et al. titled "Anonymous Disposable Email Addressing System and Method of Use Thereo[f]", filed Feb. 1, 2007, describes a system where a sender can establish a communication channel with a recipient based on aliases. If the recipient wishes, the channel can be blocked to reduce spam directed along the channel. Another example that is more closely focused on the sender includes U.S. Pat. No. 6,591,291 to Gabber et al. titled "System and Method for Providing Anonymous Remailing and Filtering of Electronic Mail", filed Mar. 12, 1998. Gabber describes a system where a sender's address is replaced without requiring a use of a look-up table. U.S. Pat. No. 7,231,428 to Teague titled "Communication System Using Alias Management Rules for Automatically Changing Sender Alias in a Message Based on Group that Includes Recipient Address", filed May 28, 2003, provides further capabilities directed to processing emails by using aliases for senders and where a recipient can have multiple aliases. Although useful for protecting identifies of individual address owners, the above references fail to address protecting addresses managed by others or by a distribution list owner.

Still others have attempted to resolve some of the issued with protecting and managing addresses by focusing on how messages are processed in general. U.S. Pat. No. 7,472,153 to Ben-Yoseph et al. titled "Bulk Message Identification", filed Dec. 30, 2002, for example, describes a system where messages sent in bulk are treated distinctively in response to a sender's complying with a policy. Unfortunately, Ben-Yoseph also fails to offer guidance on how to properly manage address lists owned by others.

Still further progress is made toward managing addresses in general by U.S. patent application publication 2005/0114453 to Hardt titled "Pseudonymous Email Address Manager" Nov. 17, 2003. Hardt discloses a system where a recipient can use disposable email addresses as aliases and can modify message routing rules for messages addressed to the aliases. Even though Hardt contemplates a more mature approach to protecting addresses, Hardt also fails to appreciate that owners of a list of addresses require protection or auditing capabilities.

Yet still others attempted to address various aspects of distribution list or alias management as indicated by the following references:
- U.S. Pat. No. 5,990,886 to Serdy et al. titled "Graphically Creating E-Mail Distribution List with Geographic Area Selector on Map", filed Dec. 1, 1997, discusses using a map to select groups of recipients.
- U.S. Pat. No. 7,120,927 to Beyda et al. titled "System and Method for E-Mail Alias Registration", filed Jun. 9, 1999, describes an alias relay server that requires users to register with the serve before forwarding emails to an alias address.
- U.S. Pat. No. 7,359,493 to Wang et al. titled "Bulk Voicemail", filed Apr. 11, 2003, discusses identifying a group of recipients for voice mail based on stored targeting data.
- U.S. patent application publication 2005/0204011 to Velayudham titled "Dynamic Private Email Aliases", filed Mar. 11, 2005, describes creating alias based on indicia pertaining to communication context.

What has yet to be appreciated is an alias that is used as an abstraction for a distribution list can be treated as a manageable object and valuable commodity separate from a distribution list. By changing focus from managing addresses or lists to managing aliases, many of the previously discussed issues can be readily addressed. For example, an alias management platform can be offered to distribution list owners through which aliases referencing their lists can be controlled or managed via an alias management policy. A list owner can manually or even automatically create an alias for a list and then offer the alias to interested parties. The platform can monitor the use of the alias to create an auditing trail reflecting the history of how the alias was used. In response, a list owner, or other managing entity, can enforce alias policies to ensure message senders, members of a message distribution chain, or other alias user properly behave according to the alias policy.

It has also yet to be appreciated that aliases, lists, or addresses can be treated as separate distinct objects within an alias management system. For example, aliases can have properties that are distinct from list properties or from address properties. Alias properties or alias attributes can be used by list owners to manage aliases distinctly from their lists. Furthermore, entities wishing to purchase access to aliases can shop or search for aliases based on attributes associated with a desirable content distribution chain. Attributes that their needs can include price, terms of use, number of uses, or other attributes associated with an alias.

Thus, there is still a need for system, methods, configuration, or apparatus for managing aliases.

SUMMARY OF THE INVENTION

The inventive subject matter provides apparatus, systems and methods in which aliases can be managed as a commodity to support sending messages. One aspect of the inventive subject matter includes methods of managing aliases, preferably through the use of an Alias Management Server (AMS) that can provide a for-fee service for sending content to target addresses through the use of an alias. An AMS can be configured to control usage of an alias and configured to store one or more distribution lists, where each distribution list can have list attributes. A distribution list, also referred to as "a list", can comprise one or more addresses of possible message recipients. An alias user can be allowed to submit desirable criteria for a desirable content distribution chain (e.g., aliases, lists, addresses, etc.), where the desirable criteria include properties of a desirable alias. The desirable criteria can be used to identify one or more distribution lists having list attributes that satisfy at least some of the desirable criteria. Additionally, an alias can be provided that points to one or more of the identified lists where the alias has at least some of the properties of the desirable alias. Access to the alias can be provided to the alias user, preferably in exchange for a fee, so the user can send messages addressed to the alias. In more preferred embodiments, the AMS causes the message to be sent to addresses within the one or more distribution lists, possibly by authenticating the alias user or authorizing one or more message servers to send the message.

Some embodiments also provide support for establishing alias management policies governing usage of the alias within a content distribution chain or for establishing alias attributes that include alias metrics. Users of the AMS could be offered a policy interface, possibly a web interface, for creating defining policy criteria. It is also contemplated that a policy can be automatically established based on conditions previously defined, possibly by list owners. A foundation for an auditing system can be put into place by properly defining the management rules with respect to usage metrics. As message senders or other alias users use an alias, the AMS can update or modify the various metrics in accordance or in compliance to the policy as the users interact with the alias. Users can obtain audit reports outlining use of an alias with respect to various metrics.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 7B presents a schematic of a possible alias user interface, which presents aliases that meet at least some of an alias user's queries and also presents a policy for an alias.

DETAILED DESCRIPTION

Throughout the following discussion, numerous references will be made to servers, services, interfaces, platforms, or other systems formed from computing devices. It should be appreciated that the use of such terms is deemed to represent one or more computing devices having at least one processor configured to execute software instructions stored on a computer readable media. For example, a server can include a computer operating as a web server, database server, or other type of computer server in a manner to fulfill described roles, responsibilities, or functions. One should appreciate that the deployment of the disclosed subject matter provides a platform that reduces an amount of processing time for managing aliases or distribution lists. Another technical effect provided by the inventive subject matter includes forming a security layer between an alias user and electronic messaging addresses. Such a security layer protects the addresses from improper use.

In the following discussion, the term "message sender" is used to reference an entity, preferably external to the AMS, which engages with the AMS to send messages to recipients. It should be understood that the term can be equally applied to other members of a distribution chain, all of which could be alias users in some from, and should not be interpreted as limited to a single type of entity, an advertiser for example. Furthermore, one should note that "message sender" represents one of multiple types of alias users. Although the following discussion is presented from a "message sender" perspective, the discussion is considered to pertain to the broader concept of a general "alias user". Additionally, the term "message" is used to reference data that can be sent digitally and should not be interpreted to include only emails. A message can include text, audio, video, images, encoded data, encrypted data, protocol data, or other types of digital data sent through an electronic content distribution chain.

Aliasing Overview

The following discussion is presented within the context of aliasing a list of addresses at each point of distribution chain, and managing the associations or rules governing the validity of each alias. The concept presented can be employed for at least (a) generating one or more address aliases, referred to as an "alias", each associated with one or more addresses of recipients (e.g., a list), (b) maintaining records pertaining to the validity and conditions of use for each alias, or (c) conveying the validity and conditions of use of such alias to a third party or system, possibly as an auditing system.

Figure 1:
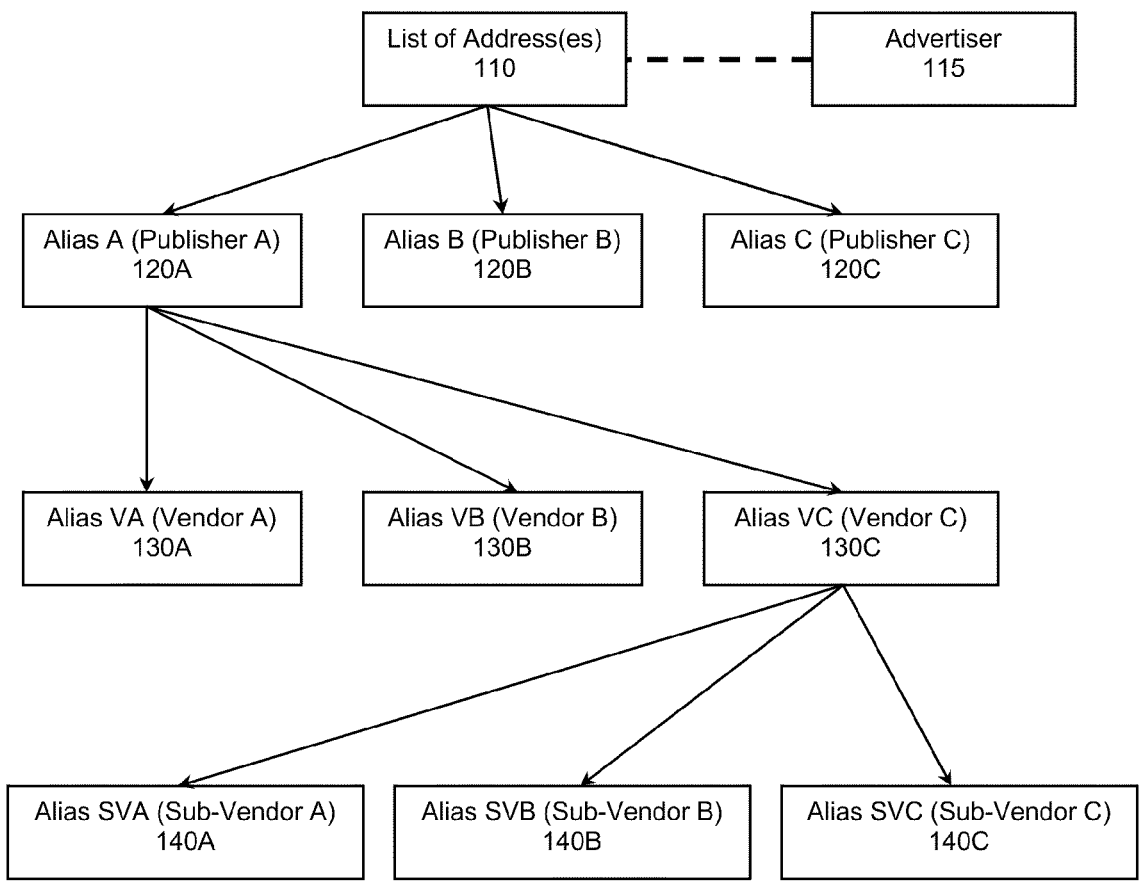
FIG. 1 is a schematic overview of an aliased distribution chain for a message.

Consider for example the scenario depicted in FIG. 1. Advertiser 115 uses publishers A, B, and C to assist in the origination and delivery of messaging content to list 110 comprising one or more addresses. Instead of giving each of the publishers a copy of list 110, advertiser 115 gives each a unique aliased version of the original list. In the example shown publisher A is given alias 120A, publisher B is given alias 120B, and publisher C is given alias 120C. Each of the aliases 120A through 120C can be translated back to list 110. One beneficial result of the described approach is advertiser 115, the owner of list 110, has retained control of valuable, possibly confidential, data. In addition, if advertiser 115 encounters circumstances where a relationship with one of the publishers should be canceled, advertiser 115 can terminate the validity of the corresponding alias. At no point in time is list 110 exposed or vulnerable, even after termination of a relationship. Advertiser 115 also can be offered the ability to monitor all communications sent to the aliases to ensure each publisher complies with established alias management policies by which they are authorized to use the aliases.

One facet to the embodiments disclosed herein is the flexibility provided to support any number of independent or dependent vendor relationships. For example, an advertiser 115 can provide one or more of list 110 to publishers A, B and C. Publisher A may in turn work with three service providers, vendors A, B and C, who could require access to list 110. Vendor C can in turn works with sub-vendors A, B and C. By utilizing contemplated embodiments, address list 110 can be aliased at each point of the message distribution. Address list 110 can be aliased as alias 120A for use by publisher A, which in turn can be aliased as aliases 130A, 130B, or 130C for the vendors. Similarly, alias 130C could also be aliased as aliases 140A, 140B, or 140C for the sub-venders. A message sent to alias 140C can be directed to members of list 110 by translating alias 140C back to list 110 via the hierarchal alias chain. In a preferred embodiment, an alias management system tracks the usage of each issued alias.

Aliasing Management System

Figure 2:
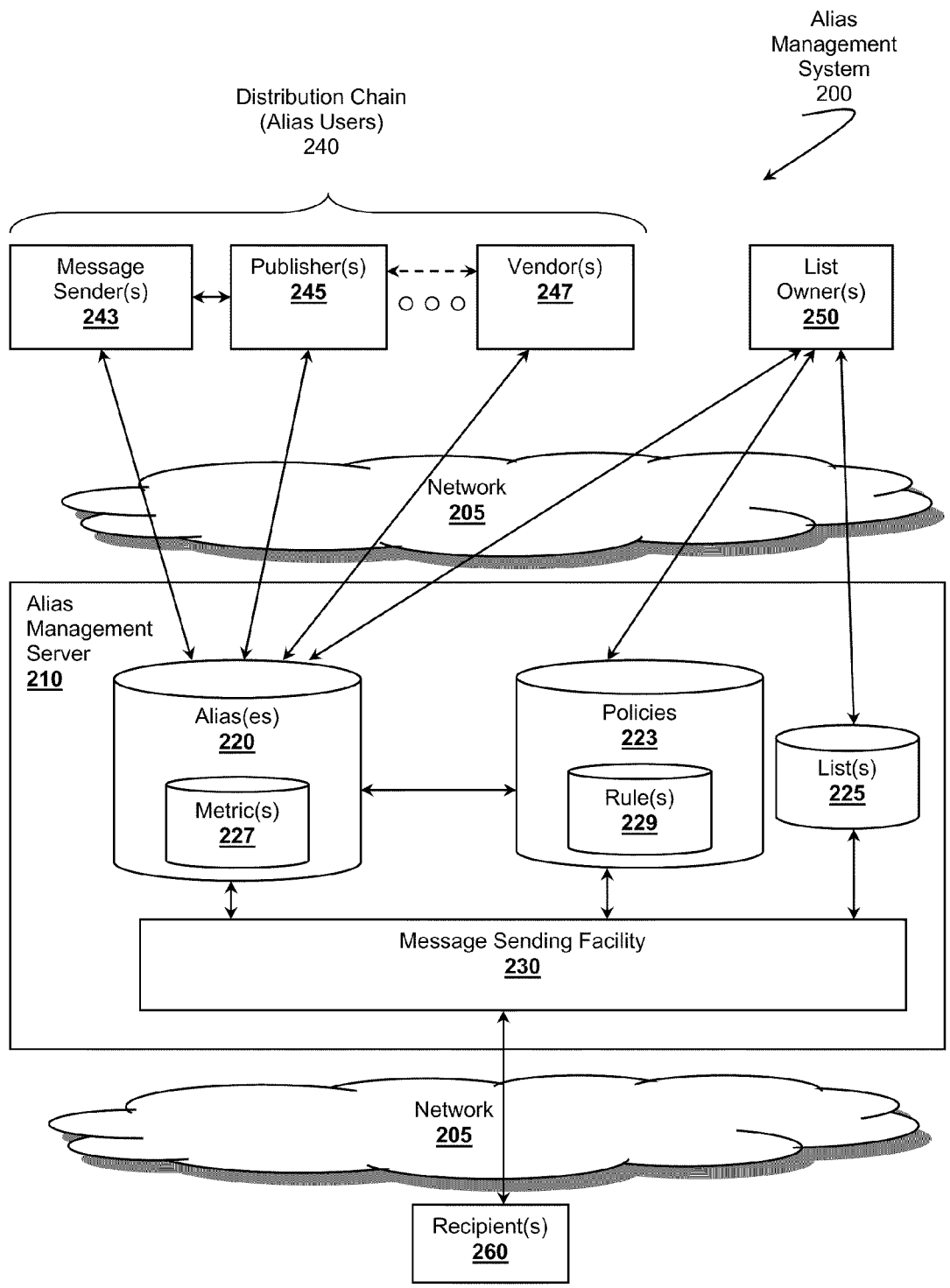
FIG. 2 presents an overview of a possible alias management system.

FIG. 2 presents an overview of possible alias management system 200. Management system 200 preferably includes alias manager server (AMS) 210 configured to manage one or more of aliases 220 that can be translated into addresses within one or more of distribution lists 225. Members of distribution chain 240 or distribution list owners 250 can interact with AMS 210 preferably over network 205. List owners 250 can utilize AMS 210 to store lists 225, establish policies 223, or monitor the usage of aliases 220. Use of aliases 220 can be tracked or audited by ensuring that policies 223 include alias management rules 229 or alias usage metrics 227. Rules 229 can govern the usage of aliases 220 with respect to tracked metrics 227. An audit trail can be provided to a user based on rules 229 and metrics 227. Distribution chain 240 can interact with AMS 210 to send one or more messages by addressing the messages to aliases 220. AMS 210 preferably translates aliases 220 into one or more addresses within lists 225 and can then cause the message to be sent to recipients 260, preferably over network 205, via message sending facility 230. By using AMS 210 to manage aliases 220, the addresses within list 225 are remain unexposed to members of distribution chain 240. Thus an address or list owner retains full control over their assets while also gaining the benefit of selling access to the assets.

One should appreciate that AMS 210 can comprise one or more computing devices working together to provide server functionality over network 205. In more preferred embodiments, AMS 210 can provide many network services that include web services, electronic messaging services (e.g., email, twitter, instant messaging, SMS, MMS, voice chat, video chat, etc.), database services, data storage and retrieval services, or other network based services.

Network 205 preferably includes a packet switched network, wired or wireless, possibly the Internet. It is also contemplated that network 205 can include cell phone networks, or other types of networks capable of exchanging data among the members of system 200.

AMS 210 preferably offers interfaces to list owners 250 or members of distribution chain 240. For example, AMS 210 can offer a list or a policy interface through which list owners 250 can work with distributions list 225, policies 223, aliases 220, or other features to which owners 250 are authorized to access. Similarly, members of distribution chain 240 can be offered an alias interface through which they can access aliases 220 for which they are authorized to use.

In a preferred embodiment, the contemplated interfaces can be offered via web services. Example web services comprise web pages that include instructions for remote computers to render a display through which individuals can interact. Another example includes offering a web service API through which computing systems can interact with ASM 210.

List owners 250 preferably interact with AMS 210 over network 205 to ensure aliases 220 are properly used in relation to lists 225. In a preferred embodiment, AMS 210 allows list owners to manage aliases 220, to store lists 225 on AMS 210, or to establish policies 223. Lists 225 can be stored within any suitable database or on any suitable storage device. Acceptable storage devices include HDDs, SSDs, SANs, NASes, RAID systems, memories, or other storage devices.

List 225 can include one or more addresses representing target recipients. Preferred addresses include actual email addresses. Other addresses can also be supported. Example addresses can include URLs, URIs, phone numbers, instant message identifiers, social network monikers, or other addressing schemes that target a recipient. It should also be appreciated that the addresses could also include aliases for the recipient's address.

Policies 223 are preferably based on usage metrics 227 and management rules 229 that govern how aliases 220 should be employed. In some embodiments, an instance of policy 223 applies to a one of aliases 220, which in turn maps to a single one of distribution list 225. One should note that the disclosed system can also support many-to-many relationships among the various logical components. For example, policies 223 could be arranged in a hierarchical manner where each level of the hierarchy corresponds to members of distribution chain 240. Additionally, each level of the hierarchy could inherit rules or metric dependencies from the level's parent. In such an embodiment, an alias 220 or a group of aliases 220 could be managed by a set of policies 223. Although metrics 227 are illustrated as bound to aliases 220, it is also contemplated that alias metrics 227 could be stored separately from aliases 220, possibly along with policies 223.

Metrics 227 can take on many different forms that preferably target the needs of list owners 250 or alias users to manage aliases 220 or to audit use of aliases 220. Metrics 227 can include single-valued metrics or multi-valued metrics. Example single-valued metrics include simple counters (e.g., number of uses, number of messages, etc.), measures (e.g., rate of messages, amount of data sent, etc.), Boolean flags, costs or monetary values, dates or times, ratings, thresholds, pointers to other objects (e.g., aliases, lists, addresses, owners, etc.) or other single numeric values. One should also note that single-valued metrics can include other forms of data beyond numeric values including text strings, literals, or other data types. For example a text based single-value metric could include the identity of the last member of distribution chain 240 that used one of aliases 220. Example multi-valued metrics can include an tag-value pair, possibly an a priori defined pair provided as a part of a policy template, or defined by an external entity (e.g., list owner 250), or even an array of information possibly used to form a historical record or log of a set of metrics. Metrics 227 provide one aspect of supporting an auditing trail. As aliases 220 are used AMS 210 can update metrics 227 or otherwise maintain auditing records relating to the validity or use of aliases 220.

Similarly, rules 229 can also take on many different forms and preferably depend on metrics 227 to support monitoring usage of aliases 220. Rules 229 can include programmatic instructions possibly supplied by list owners 250, templates offered by AMS 210, selectable options, functions, or other instructions provided to AMS 210 to be incorporated into policies 223. Rules 229 can include simple instructions, "update a counter", for example. Rules 229 can also comprise more complex instructions that include evaluation of an expression followed by an enforcement action. For example, if an alias 220 is used more than a defined number of times, AMS 210 could delete, remove, or otherwise disable alias 220. Alternatively and more severely, AMS 210 could ban a message sender 243 (e.g., an alias user) for violating a policy 223.

As members of distribution chain 240 interact with AMS 210 to send content addressed to aliases 220, AMS 210 updates metrics 227 according to rules 229 of polices 223. AMS 210 can evaluate rules 229 based on current values of metrics 227 to determine if policies 223 should be enforced. When AMS 210 determines criteria for a rule 229 is satisfied, AMS 210 can take appropriate action. Contemplated actions can include sending alerts or notifications, validating aliases 220, validating the alias user accessing an alias 220 (e.g., message sender 243, publisher 245, vendor 247, etc.), restricting access to aliases 220 based on various metrics (e.g., time, date, attributes, rates, number, etc.), or other desirable action.

In some embodiments, ASM 210 includes an alias analytics engine (not shown) configured to aid individuals to monitor or audit use of aliases 220. It is contemplated that the analytics engine can be used to conduct dynamic trend analysis of metrics 227 with respect to each other to determined correlations among aliases 220, lists, addresses, attributes, or other objects. For example, an analysis can be conducted to find correlations among alias attributes, list attributes, address attributes, or other properties with respect to metrics 227. If correlations are found, then list owners 250 can optimize lists 225 to increase their value without modifying aliases 220, and can then present aliases 220 to members of distribution chain 240 as a valuable commodity. Additionally an alias analytics engine could utilize multi-valued metrics to track historical data relating to using an alias, which can be presented via a reporting interface (e.g., web interface, display screen, etc.) to interested users. Such an approach allows for presenting an auditing trail of how aliases 220 are used and by whom at each point of a distribution chain.

One should note that AMS 210 can represent a foundational element of a for-fee service. In some embodiments, AMS 210 operates as an intermediary alias broker or clearing house where list owners 250 can securely store distribution lists 225 and provide aliases 220 to message senders 243. In such embodiments fees paid to AMS 210 can be distributed to appropriate list owners 250. In other embodiments, AMS 210 can operate local to list owners 250, possibly as an installable software or hardware-based system. Alias users can pay a fee in exchange for a provided alias 220 or for causing a message addressed to alias 220 to be sent addresses in a referenced list 225. In some embodiments, the fees are determined by conducting an auction for access rights to alias 220.

Aliases

Figure 3:
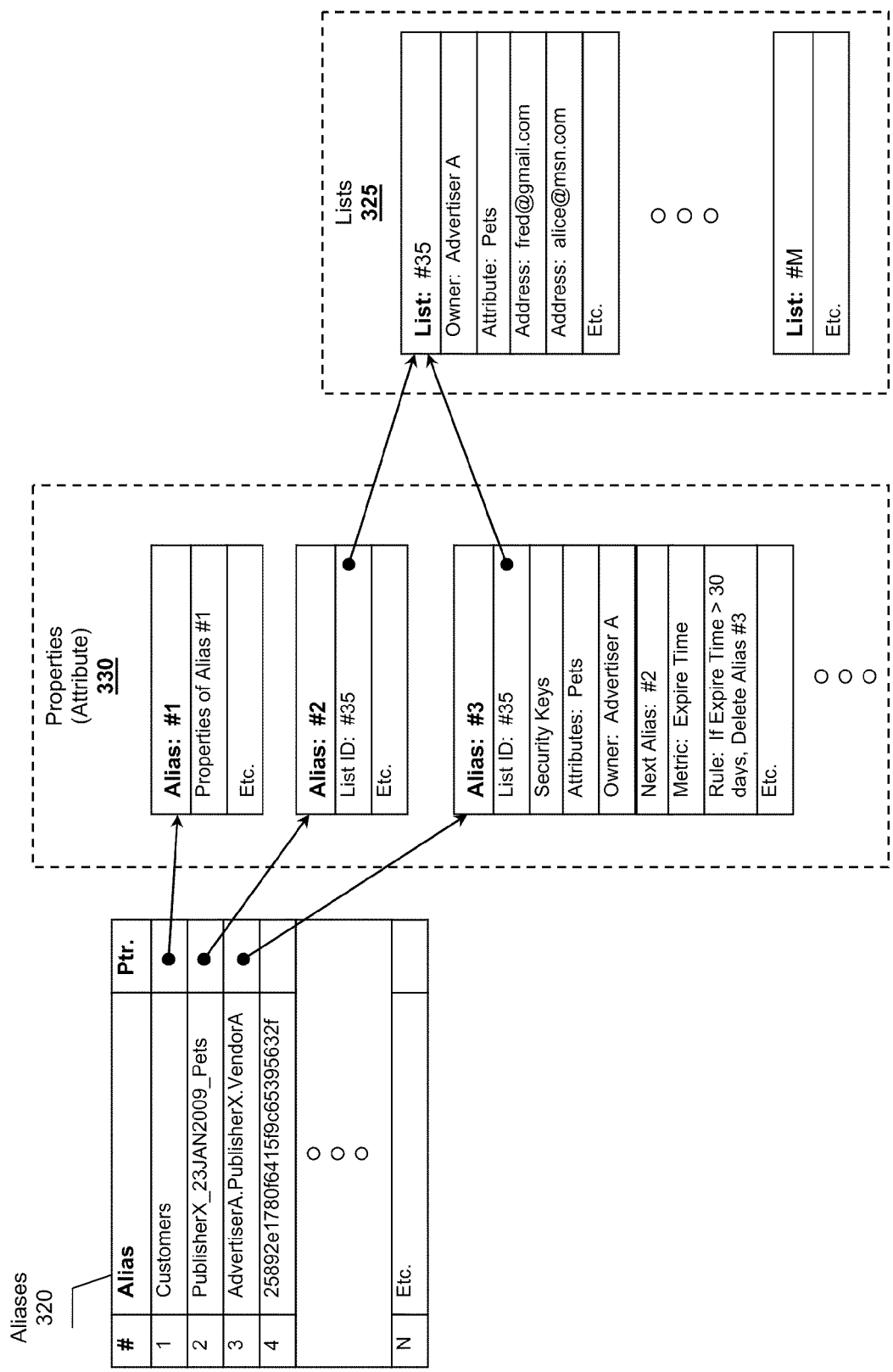
FIG. 3 is a schematic illustrating various aspects of aliases.

FIG. 3 presents a possible interrelationship among aliases 320, alias properties 330, and lists 325, and illustrates various potential aspects associated with aliases 320. Aliases 320 represent a table of aliases stored on an AMS. Aliases 320 can be stored or retrieved through any acceptable means including using a look-up table, database queries, hash tables, a search engine, or other suitable data management system.

Aliases 320 can be used as a destination address within a message and can take on many different forms depending on the target message deliver technology or infrastructure. As illustrated alias #1 can be a text string used to represent a target group of recipients, "customers" for example. Assuming an email-based infrastructure, a message sender (e.g., an alias user) using alias #1 can address messages to a target alias, for example "customers@ams.com". More preferred aliases 320 are encoded with additional information that could be used by an AMS to determine validity of an alias or restrictions on its use. For example, alias #2 identifies that the alias is (a) used by Publisher X, (b) valid until Jan. 23, 2009, or (c) targets recipients or distribution lists tagged with a "pets" attribute. Additionally, aliases 320 can be encoded with hierarchical information indicating how the alias relates to a distribution chain. Alias #3 indicates that the alias is intended to be used by Vendor Z who is also part of a distribution chain originated by Advertiser A and in which Publisher X participates. Aliases 320 can be similar to addresses in that an alias can represent a properly formed address with respect to a messaging protocol, or the protocol's addressing namespace.

One should appreciate that aliases 320 can be encoded with desirable information that could be used by AMS to track or audit the use of aliases 320. Furthermore, aliases 320 can appear as a random set of characters that encode desired information. For example, alias #4 could include bit fields that encode useful information, or could represent a GUID or other identifier used by an AMS to look-up properties or attributes of the alias 320 or to reference a target list 325. Once the AMS receives an alias 320, the AMS can translate the alias to derive encoded information or to determine which of list 325 the alias references. Once translated, the AMS can then determine which actions, if any, should be taken in compliance with the alias's policy.

In a preferred embodiment, aliases 320 have one or more associated attributes or properties 330 as illustrated in FIG. 3. Although FIG. 3 shows a pointer from aliases 320 to tables in properties 330, one should appreciate those properties 330 can be bound using many different suitable data structures or other type of relationships. Properties 330 can comprise additional information relating to aliases including policy information, rules, metrics, list identifiers, attributes, owners, related aliases, or other desirable information. As message senders, members of their distribution chain, or other alias users interact with one of aliases 320, the AMS can consult the corresponding properties 330 of the alias to determine which actions to take. It is also contemplated that list owners or the AMS could adjust properties 330, assuming proper authentication or authorization, as desired to better fit how aliases 320 should be used.

Suitable methods for providing aliases that can be adapted for use with the presently disclosed subject matter include methods of creating aliases as described by U.S. Pat. No. 7,558,827 to Kawashima et al. titled "Mail Distribution System, Mail Distribution Method, and Mail Distribution Program", filed Oct. 14, 2004; U.S. Pat. No. 6,591,291 to Gabber et al. titled "System and Method for Providing Anonymous Remailing and Filtering of Electronic Mail", filed Mar. 12, 1998; and U.S. patent application publication 2005/0204011 to Velayudham titled "Dynamic Private Email Aliases", filed Mar. 11, 2005. Aliases 320 can be provided by an AMS automatically creating an alias 320 according to any suitable algorithm or alias policy. It is also contemplated that individuals could manually create or otherwise provide an alias, if desired, possibly through a web-based interface. Providing an alias 320 is considered to extend beyond merely providing name and can include additional concepts. For example, providing an alias can include configuring an AMS to create the alias, store alias attributes, established metrics for the alias, point the alias to aliases, modify or update distribution chain, or other actions relating to establishing a valid alias for use.

Preferably aliases 320 point to one or more distribution lists 325, directly or indirectly as shown. It is also contemplated that multiple ones of aliases 320 can point to the same distribution list as illustrated with respect to alias #2 and alias #3. Although aliases 320 are shown as pointing to lists 325, one should note that it is specifically contemplated that an alias 320 could point to one or more other aliases 320. For example, alias #3 could point to alias #2, which can than point to one of lists 325.

Lists 325 represent a list of recipient's addresses. In some embodiments, the addresses correspond to email addresses of target recipients. The addresses in lists 325 could include other types of addresses other than email addresses. For example, lists 325 could contain network addresses capable of receiving a message (e.g., IP addresses, ports, URLs, URIs, etc.), instant messaging addresses, social networking monikers, phone numbers, or other types of addresses where a recipient could receive a message. More preferred addresses represent a properly formed address with respect to a messaging protocol or its addressing namespace.

In a preferred embodiment, lists 325 can be bound with one or more list owners that indicate who owns lists 325, or possibly who owns each address on lists 325. Additionally, lists 325, or even addresses, can be also associated with attributes that can be used by an AMS to match message senders, or other alias users, with desirable recipients. For example, alias #3 is intended to target recipients who have an interest in "pets". List #35 represents addresses of recipient addresses tag with a "pets" address attribute. It should be appreciated that any number of list attributes could be associated with a list, or even address attributes with the addresses.

Alias Chains

Figure 4:
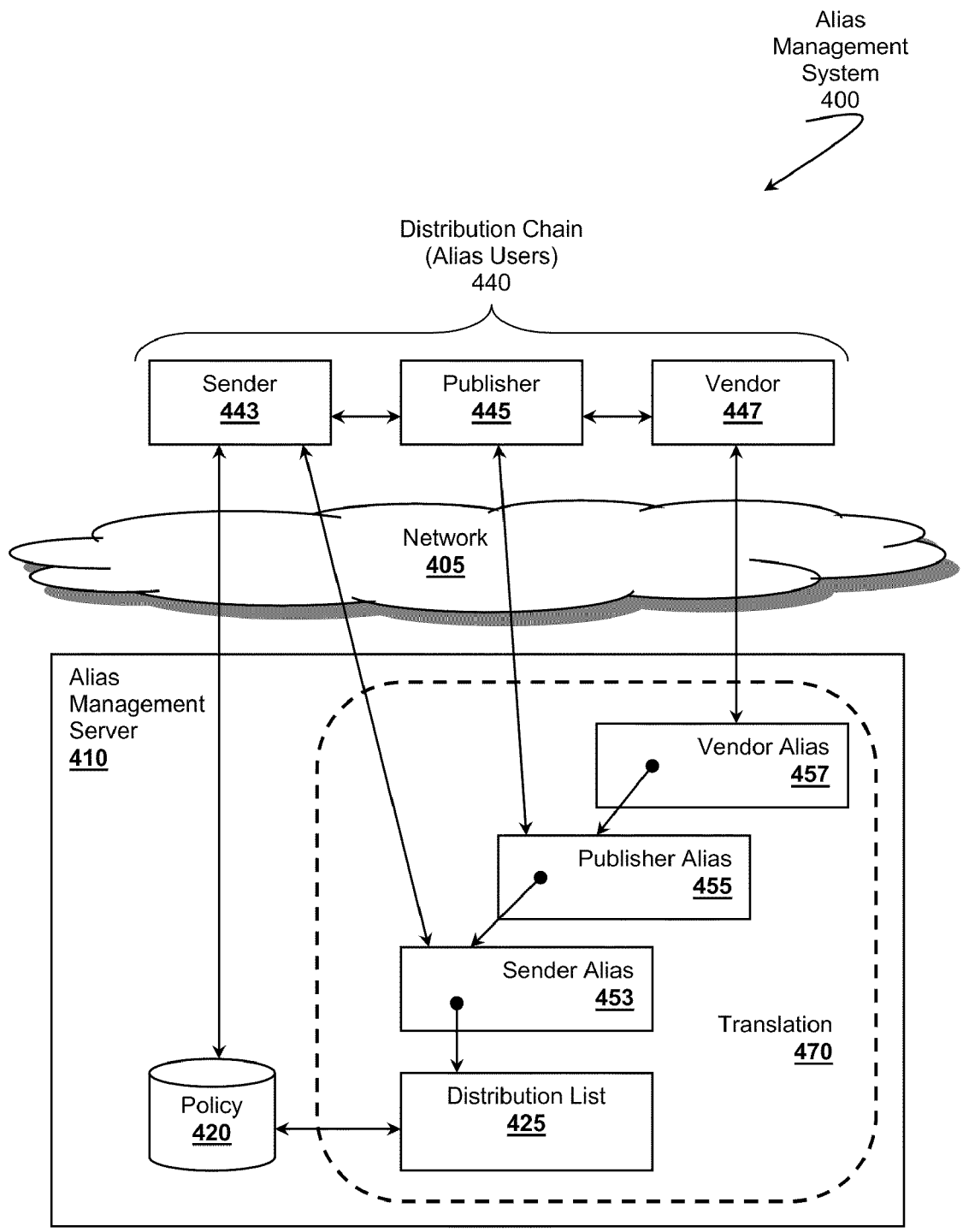
FIG. 4 is a schematic of a possible alias management system that supports aliased distribution chain.

FIG. 4 presents an embodiment where alias management system 400 supports causing a message addressed to an alias to be sent from sender 443, an alias user, via distribution chain 440 similar to the approach discussed with respect to FIG. 1.

Consider a scenario where sender 443 is the owner of list 425. Sender 443 can engage with other members of distribution chain 440, publisher 445 and vendor 447 for example, to send a message targeting addresses in list 425. Sender 443 can use AMS 410 to establish policy 420 that governs how aliases associated with sender 443 are managed, including sender alias 453, publisher alias 455, or vendor alias 457. Furthermore, sender 443 can establish a hierarchical chain of aliases where other alias users including members of distribution chain 440 have their own aliases. Although a hierarchical chain of aliases is shown, one should appreciate that other types of interrelationships among aliases can also be employed. For example, aliases could be members of a flat group, where each alias points directly to list 425, as opposed to pointing from one alias to another.

In embodiments supporting chained aliases preferably the list owner, sender 443 in this case, retains control over or inherits permissions to manage aliases in the chain. For example, sender 443 would have rights to manage publisher alias 455. Additionally, if vendor alias 457 is created via AMS 410 to point to publisher alias 455, then sender 443 would also have privileges to manage alias 457. Management actions relating to the aliases can include enabling aliases, disabling aliases, creating aliases, deleting aliases, changing the aliases' policies, or other actions that affect the aliases.

Although policy 420 is represented as a single policy, one should note that each alias could have its own instance of policy 420. Furthermore, is contemplated that each member of a distribution chain 440 could have a specific alias policy 420 customized for their respective aliases. It is also contemplated that multiple policies 420 could depend or inherit rules or metrics to reflect the policy's position in a hierarchy.

As members of distribution chain 440 engage with AMS 410 to utilize their respective aliases, AMS 410 monitors or otherwise creates an audit trail according to policy 420. Should any of the members of chain 440 violate policy 420, sender 443 can terminate or otherwise disable their corresponding aliases without being concerned about exposing their valuable addressees. In a preferred embodiment, AMS 410 can also take action according to policy 420, including sending the target message.

Sending a Message to an Alias

Figure 5A:
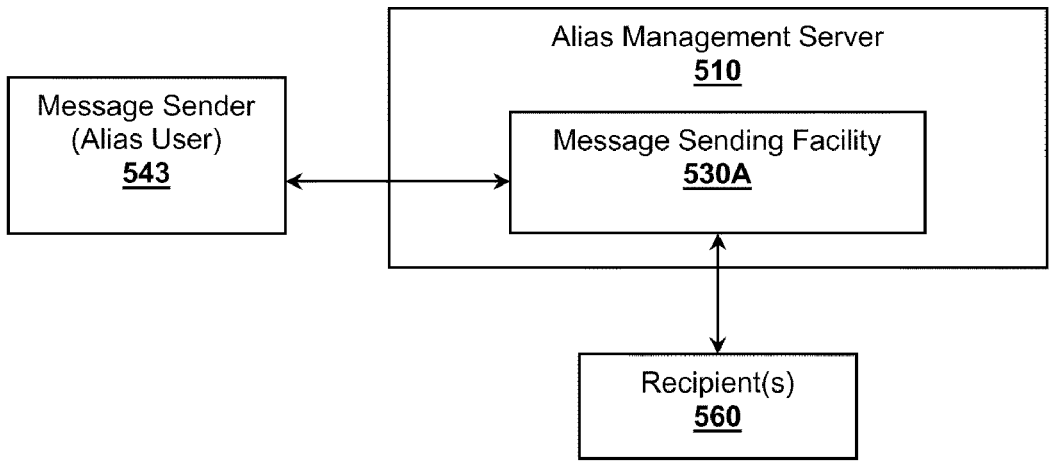
FIG. 5A presents a possible arrangement where a message sending facility is managed by an alias management server.
Figure 5B:
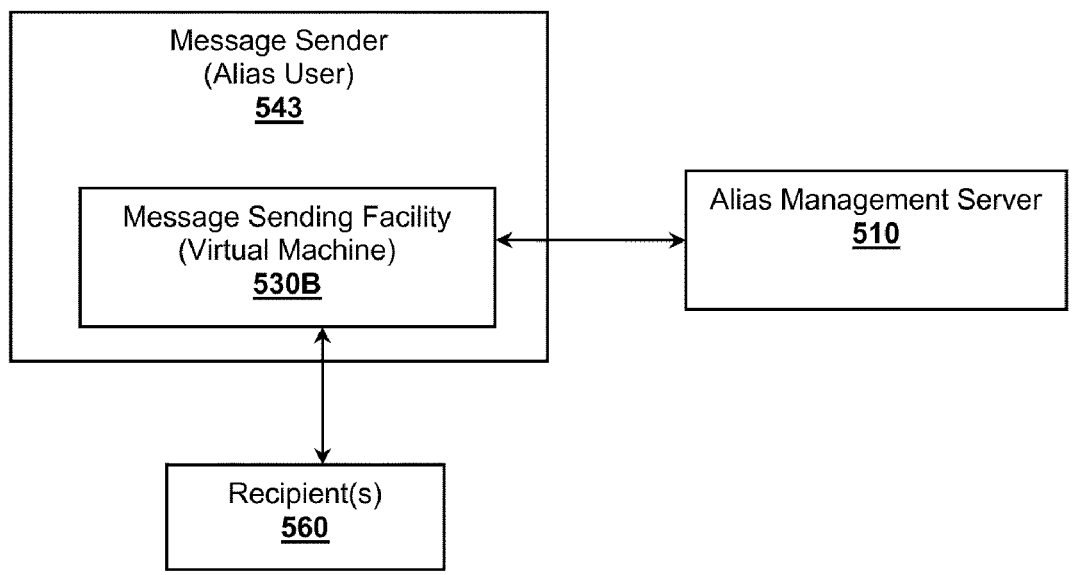
FIG. 5B presents a possible arrangement where a message sending facility is managed by an alias management server and is local to an alias user.
Figure 5C:
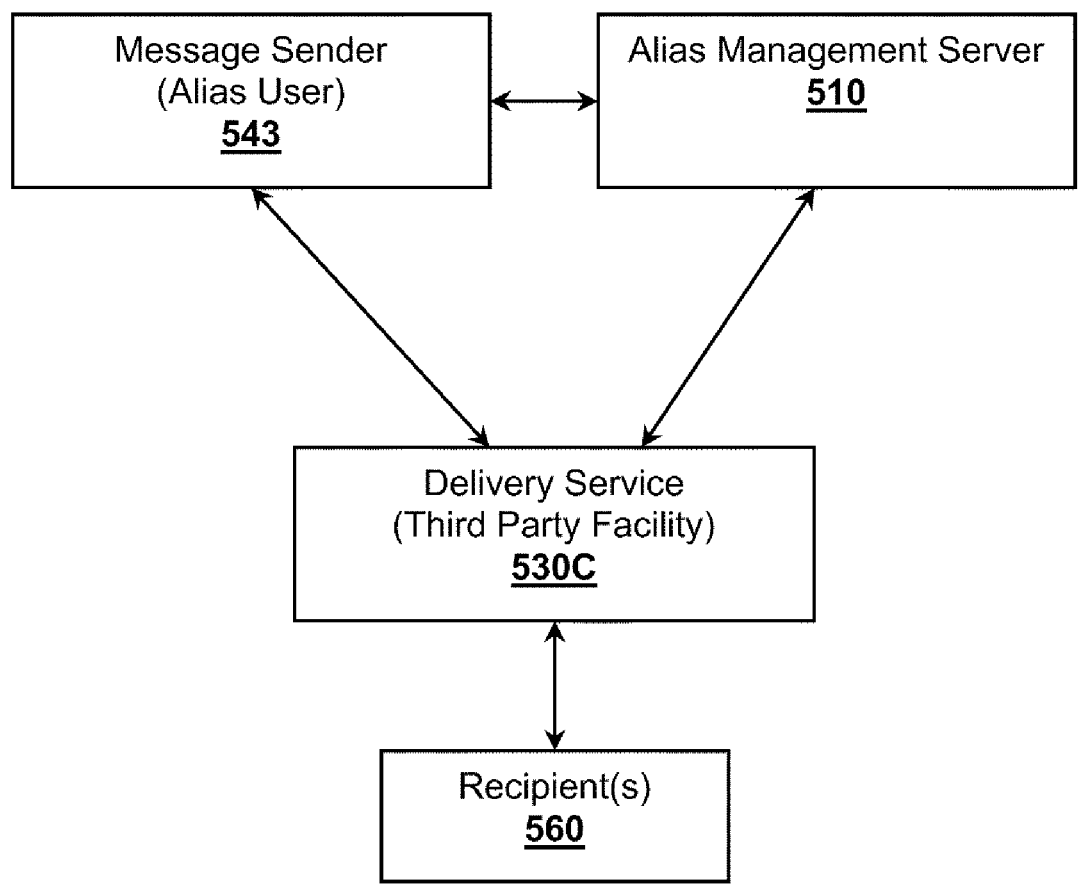
FIG. 5C presents a possible arrangement where a message sending facility is external to an alias management server and an alias user.

FIGS. 5A, 5B, and 5C illustrate a few of the many possible embodiments of how a message can be sent, preferably in a manner that retains confidentially of addresses in a distribution list. In the examples shown an alias user, message sender 543, wishes to send a message to recipients 560 according an alias management policy, and preferably employs AMS 510 to cause the message to be sent.

In FIG. 5A, AMS 510 include message sending facility 530A, which could include an SMTP server, SMS server, MMS server, VoIP server, or other types of messaging servers capable of sending a message. Message sender 543 provides message content to AMS 510 where the message content is addressed to an alias. AMS 510 takes any actions necessitated by the alias's corresponding policy, possibly including validating the alias, authenticating sender 543, updating metrics, or other actions. Once the message is confirmed to be in compliance with the policy, AMS 510 can instruct facility 530A to send the message on to recipients 560.

In FIG. 5B, message sending facility 530B is external to AMS 510 and is local to sender 543. In such an approach, facility 530B can operate within a virtual machine or server running on a computing device owned by sender 543 while operating under control of AMS 510. AMS 510 can instantiate or configure the virtual machine, provide addresses of recipients 560, and cause the virtual machine to send the messages in compliance with the alias policy. Preferably the virtual machine is secured, possibly through a secured protocol or key exchange. In such an approach, addresses of recipients remain in control of the addresses in a manner where they are unexposed to sender 543. One advantage of such an approach is the messages originate directly from sender 543. One should note that the addresses are not required to be stored on a permanent storage media (e.g., HDD, Flash, etc.), but can be transiently stored in the RAM of the secured virtual machine.

In FIG. 5C, message sending facility 530C is external to both AMS 510 and sender 543 and possibly remote from both as well. In such an embodiment, sender 543 can send the message addressed to an alias to facility 530C, which operates as a third party delivery service. Facility 530C can exchange information relating to the message and alias with AMS 510 to ensure the message is sent in compliance with the alias's policy. Once AMS 510 authorizes facility 530C to send the message, if authorization is required, facility 530C can proceed forward with sending the message to recipients 560. Facility 530C could also be a virtual server. U.S. patent application publication 2006/0245597 to Mujica titled "E-Mail System" (November 2009) provides some insights into using virtual servers for outgoing emails that could be adapted in support of the disclosed techniques.

Additional contemplated scenarios include sending a message via a virtual content server, possibly having a temporary top level domain that is associated with the alias. One advantage of such approach is the domain can be enabled or disabled as desired according to the alias policy. Techniques relating to uses of virtual content servers or uses of temporary top level domains can be found in co-owned U.S. patent application having Ser. No. 12/174,333 to Grin et al. titled "Methods of Providing Published Content" filed on Jul. 17, 2008.

Additional details regarding how a user could obtain access to an alias and send messages to the alias are discussed below in reference to FIGS. 8A and 8B.

Managing Aliases

Figure 6A:
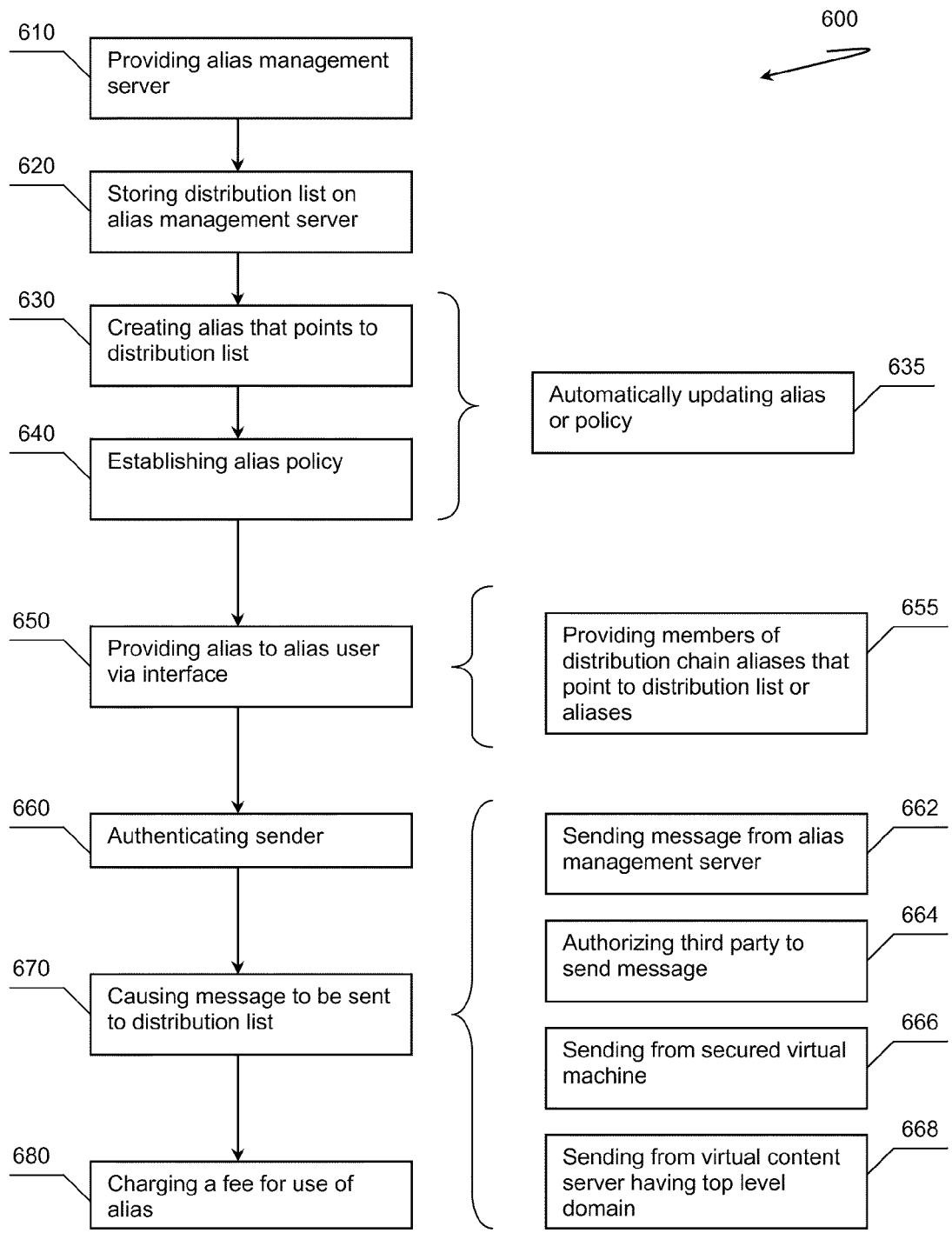
FIG. 6A presents a possible method for managing aliases.
Figure 6B:
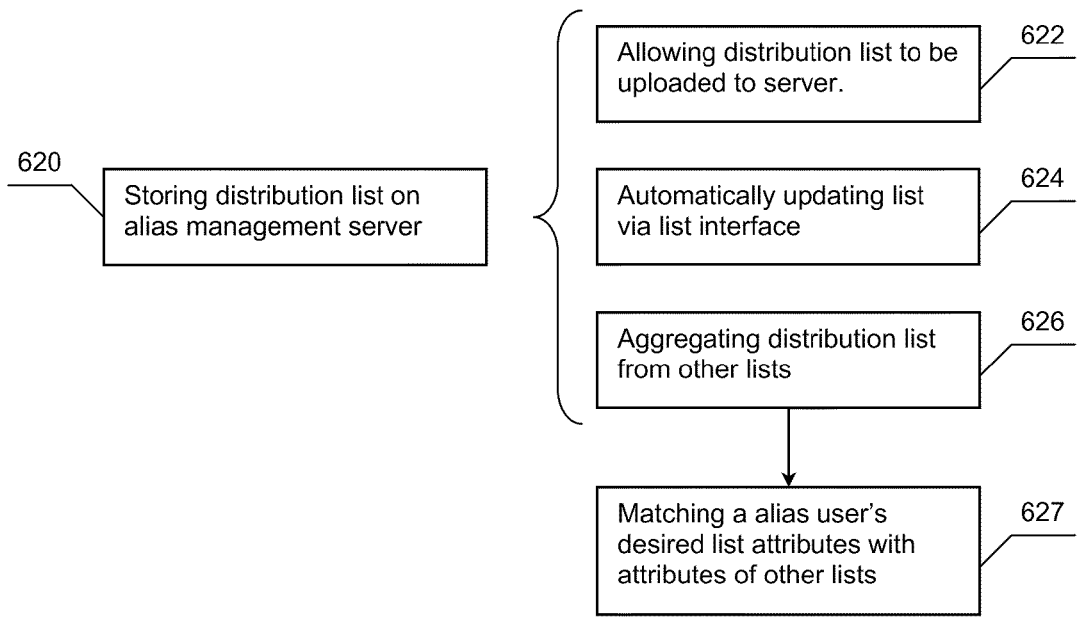
FIG. 6B presents possible additional features with respect to storing distribution lists.
Figure 6C:
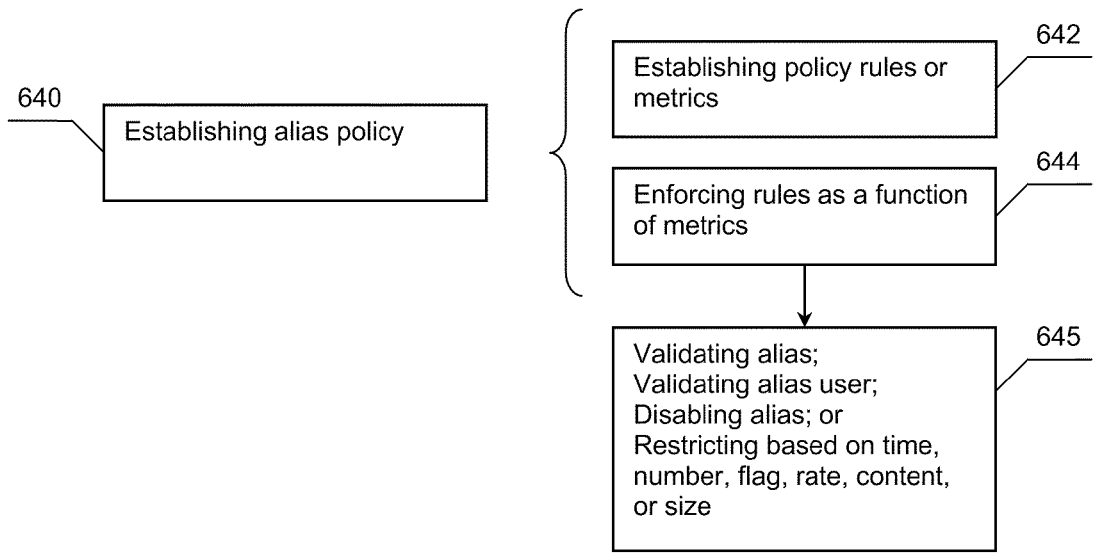
FIG. 6C presents possible additional features with respect to establishing alias policies.

FIGS. 6A, 6B, and 6C represents a possible embodiment of method 600 relating to managing aliases. One should appreciate that the disclosed steps of method 600 can be performed out of the presented order if desired. Additionally, all presented steps are not necessarily required.

Step 610 can include providing an AMS configured to full file the roles or responsibilities of alias management as previously discussed. Preferred alias management servers include computing devices connected to the Internet and capable operating as an Internet-based server through which the AMS can provide alias management services to remote users over a network, or can provide alias users (e.g., message senders, members of a distribution chain, alias brokers, etc.) access to valuable aliases.

Step 620 includes storing a distribution list on the AMS. Preferably distribution lists are stored within a database in a manner where the distribution list can be retrieved. The lists can be retrieved via queries possibly by submitting queries to a search engine within the AMS where the queries include search terms relating to attributes associated with the list. In such an approach, alias users can use the AMS to find aliases pointing to lists of interest.

FIG. 6B presents possible approaches to storing a distribution list on an AMS. For example, step 622 can include allowing one or more individuals to upload or otherwise provide a distribution list having one or more addresses to the AMS. It is also contemplated that lists can be stored via step 624 by automatically updating a list via a list interface. A list interface (e.g., a web page, web service API, API, etc.) can be presented to a list owner. The AMS can query the interface for updates to a distribution list and can affect changes. Additionally, a list owner could configure a list server to provide automatic updates to the AMS as desired.

In embodiments that include the use of list attributes or address attributes, alias users can find aliases for desirable lists as previously mentioned. An alias user can search for lists by submitting list attributes of interest to a list search engine, for example. Another example is represented by step 626 which includes aggregating a list from multiple distribution lists possibly owned by different list owners. An alias user could request a list of recipients interested in "pets" for example. The AMS can aggregate the list by searching for addresses having the address attribute of "pets" and thereby matching an alias user's desirable list attributes with attributes of other lists at step 627. As an alias user utilizes an alias associated with the aggregated list and pays a fee for access to the alias, the AMS can distribute the fee appropriately to the list owners. One should note that aggregation or otherwise forming new lists can be governed by rules or metrics of an alias policy.

Returning to FIG. 6, method 600 can also include step 630 of creating, or otherwise providing, an alias that points to one or more of the distribution lists, preferably pointing to a distribution list stored on the AMS. As previously discussed the alias can take on many different forms including a human readable text string, a number, encoded information, or other forms. It is also contemplated that the alias could include encrypted information that requires at least one public or private key to decode. Such an approach can aid in authenticating alias users or validating an alias.

Step 640 can include establishing an alias management policy that governs the usage of the created alias. A policy can be established by a list owner, possibly over a web-based interface. As used herein, the phrase "establishing a policy" is intended to convey various aspects of enabling or activating a policy for an alias. Establishing can include creating, modifying, updating, or otherwise affecting changes to a policy and activating the policy. One should appreciate that a policy can be applied to more than one alias. For example, an AMS can offer a template policy that can be applied to an alias. Each alias can have its own instance of a policy to ensure that each alias has its private metrics tracked properly. It is also contemplated that the AMS could automatically create policies if desired. In some embodiments an alias management policy could be a portion of a content distribution chain management policy.

FIG. 6C provides further information regarding approaches to establishing an alias policy. For example, preferably step 642 includes establishing one or more rules based on one or more metrics regarding the usage of an alias. As external entities engage with an alias, the AMS can update the metrics or can enforce the rules. In more preferred embodiments, rules can include an evaluation expression that triggers an action should the expression yield a specified result. Consequently, step 644 can include enforcing the rules as a function of the metrics. When criteria for a policy rule have been met, the AMS can take the specified actions. At step 645 example actions can include validating an alias, validating an alias user, disabling or deactivating an alias, restricting use of an aliased based on various metrics. Contemplated metrics that can be used to restrict use of an alias include time (e.g., absolute time, relative time, etc.), number of uses, frequency of use (e.g., either too high or too low), rate of use, message content, message size, or other metrics. All actions for enforcing a policy are contemplated including reactivating an alias, selling an alias, or others.

Distribution lists, aliases, or alias policies should be considered living objects that can change with time to reflect changes in the message distribution environment. For example, at step 635 it is contemplated that method 600 can include automatically updating an alias or policy, especially in view of changes to a distribution list. Should a list owner or the AMS change addresses in a list, it is possible the policy governing the use of the list's alias might require changing, possibly to reflect validity of the alias, the lifetime of the alias, or other aspects of the policy.

In a preferred embodiment, step 650 includes providing the alias to an alias user. The alias can be provided through any suitable methods. Preferably the alias is provided to the alias user over a network, possibly via a web interface, email, or other communication. The communication between alias user and the AMS could be secured through cryptographic approaches including using SSL, SSH, AES, DES, 3DES, or other cryptographic techniques. It is also contemplated, in embodiments supporting distribution chains, step 655 can include providing or issuing members of the distribution chain their own alias that point to a target distribution list. It is also contemplated the aliases of the members could point directly to other aliases, which in turn directly or indirectly point to the distribution list.

Some embodiments include step 660 of authenticating the alias user to allow use of an alias. Preferably, the AMS retains control of causing the message to be sent via a sending facility as previously discussed. The AMS can authenticate the alias user using known techniques possibly based on Kerberos, RADIUS, EAP, SSH, HMAC, or other existing protocols. Once an alias user is authenticated, the AMS can grant permission to the alias user to use an alias according to the alias's policy.

Preferably, at step 670, once any required authentication has been completed, the method can include causing the message addressed to the alias to be sent to addresses in the distribution list. As discussed with reference to FIGS. 5A-5C, the message can be sent using different configurations of message sending facilities. For example, step 662 can include sending the message from the AMS itself. Step 664 can include authorizing a third party to operate as a sending facility to send the message. It is also contemplated that sending the message can include sending the message from a secured virtual machine, as contemplated by step 666, where the secured virtual machine is under the control of the AMS. It is also contemplated that the secured virtual machine could be instantiated within a message sending server owned or operated by the alias user. Furthermore, the message could be sent by sending the message from a virtual content server that sends from a temporary top level domain (step 668), preferably associated with the alias. The virtual content server can be instantiated by the AMS or disabled should the alias policy dictate. The top level domain can be recycled or let go as necessary.

One should appreciate that the disclosed methods can form a foundation for a service supplied to list owners, message providers, members of a distribution chain, or other entities external to an AMS. Consequently, step 680 can include charging a fee access to an alias or for performing the step of causing the message to be sent. The fee could be a flat fee for an alias, a subscription, or other types of charges. It is also specifically contemplated that the fee can be a result of conducting an auction for the alias.

Consider a scenario where a list comprises highly valuable addresses. The AMS could conduct an auction to establish the fee to be paid to allow a user to gain access to the list via an alias. One should understand that the list owner retains control over the list at all times. Rather than merely auctioning the list, the list owner can auction access rights to the alias. For example, the list owner could auction the right to access an alias for a particular period of time or on a date, for a geographical location, for exclusivity, or other aspects. Auctioning access rights can be achieved because the list retains is value due to the list remaining under control of the list owner even after addresses on the list have been used.

Alias User Interface

Figure 7A:
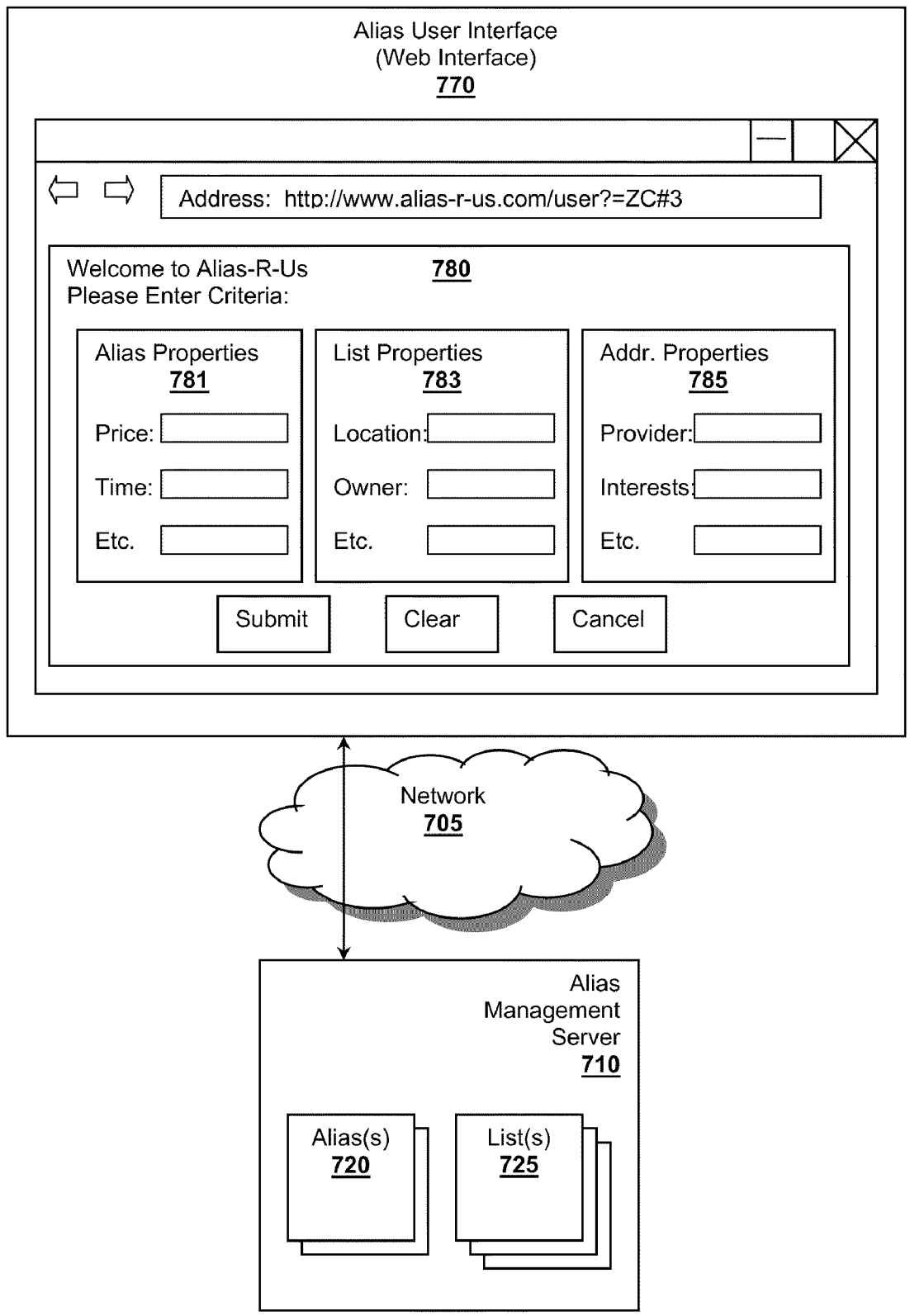
FIG. 7A presents a schematic of a possible alias user interface through which a user can search for and find aliases of interest.

In FIG. 7A, alias user interface 770 is configured by alias management server 710 to present an interface to a user through which the user can search for or find aliases having desirable properties. Interface 770 is illustrated as a web page rendered on a local computer in response to directing a browser to connect to server 710 over network 705. AMS 710 can store distribution lists 725 having various list attributes. List attributes can comprise information relating to a specific list including demographic data, psychographic data, geographic data, list owner, or other data describing the list. Server 710 also can store aliases 720, which can include properties that can be distinct from those of lists or addresses.

Interface 770 can include submission area 780, which allows an alias user to submit desirable criteria that includes properties 781 of a desirable alias. Alias properties 781 can include attributes associated with an alias. The desirable criteria can also comprise other properties beyond those pertaining to aliases including list properties 783 or address properties 785. Alias, list, or address attributes can include a wide variety of information. In some embodiments, each type of attribute (e.g., alias, list, or address) is managed separately to ensure the aliases can be retained as a distinct, manageable object relative to other objects.

Although submission area 780 is presented as several distinct fields, it is contemplated that other types of submission interfaces can also be configured for use by an alias user. For example, the area 780 could represent an API, a query field, GUI components (e.g., radio buttons, menus, etc.), or other types of components.

When a user submits the desirable criteria to AMS 710, server 710 can search through lists 725 to identify a list having list attributes that satisfy at least some of the desirable criteria. In the example shown a user might wish to find aliases that point to lists having a specific location, owner, or other characteristic.

List owners or other entities, including AMS 710, can provide an alias that points to a list where the alias has attributes or properties that satisfy at least some of desirably criteria including alias properties 781. In some embodiments, AMS 710 can create an alias that satisfies alias properties 781. One should note that an alias is not required to have attributes that exactly match properties 781. It is contemplated in some scenarios there will not be an exact match. Still, an alias user might be interested in near matches as identified by server 710.

In FIG. 7B, to continue the previous example, AMS 710 has returned aliases 791 that satisfy at least some of the submitted desirable criteria, including some of alias properties 781. In the example shown, aliases 791 are presented in a ranked list, ranked by the alias attribute "price". One should note that aliases can be ranked by any desirable alias attribute or attributes by primary, secondary, tertiary or other ranking preferences. A user can select an alias having desirable alias properties or attributes as indicated by highlighted alias #3.

It is also contemplated that interface 770 can be configured to present other aspects of an aliases beyond alias properties or attributes including list properties, address properties, or even alias policy 793. Offering alias policy 793 allows a user to make an informed decision before paying a fee to gain access to one or more selected alias. Alias policy 793 can outline rules, criteria, or conditions that govern usage of the alias as discussed previously.

It is contemplated that presenting alias attributes to an alias user can be used as a launch point for negotiating access to an alias. In such embodiments, server 710 can be configured to support a negotiation interface (not shown) through which alias users and alias owners can negotiate terms for access, possibly resulting in an alias management policy. An alias user can accept, reject, rank, or otherwise provide an indication of the desirability of various attributes or policy rules. Such indications can be applied at the attribute-level, alias-level, or other desirable resolution.

Obtaining Access to Alias

Figure 8A:
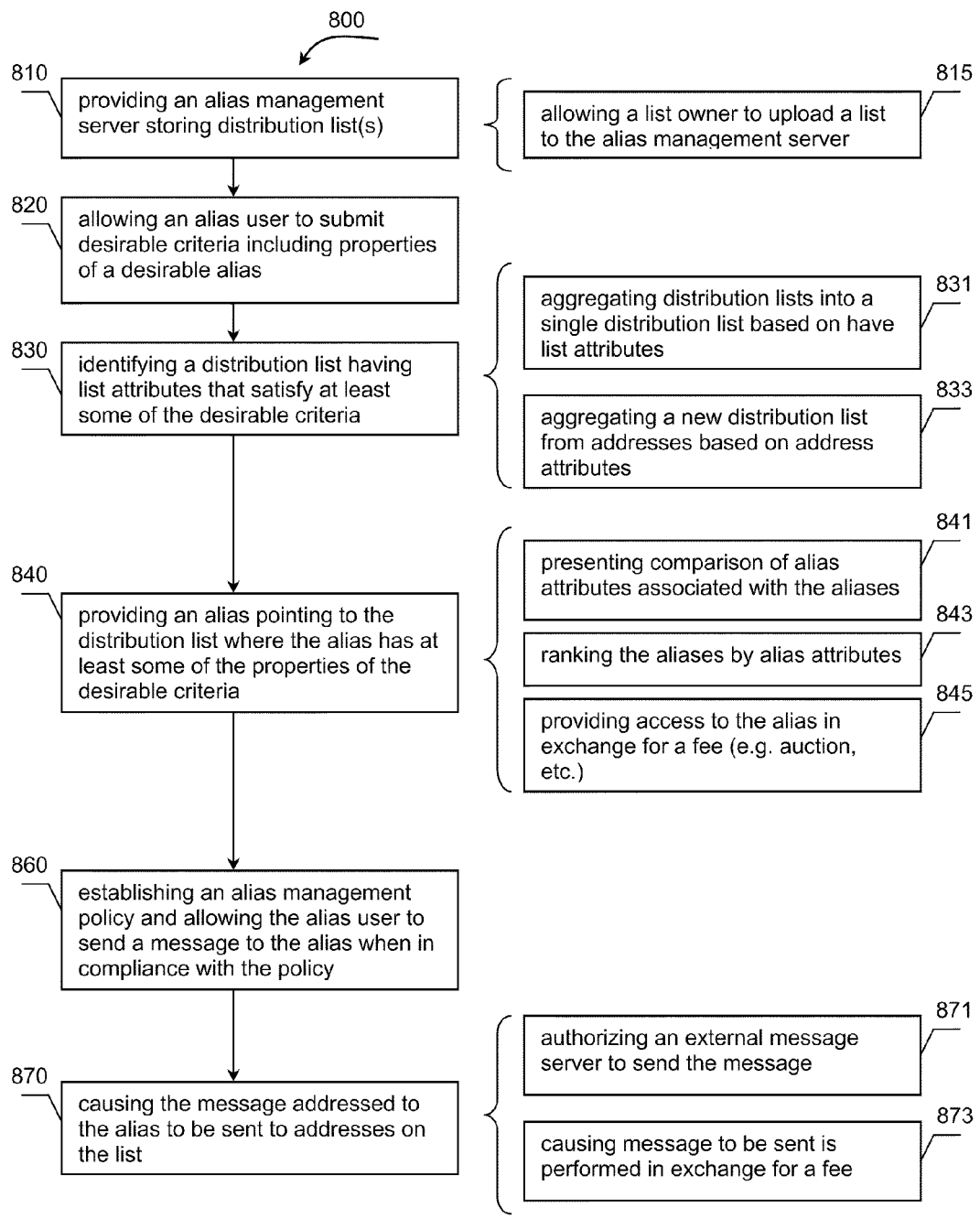
FIG. 8A presents another possible method for managing aliases in support of sending messages.

FIG. 8A presents an overview of a possible method 800 for managing alias to send messages to the alias.

Step 810 can include providing access an AMS. In more preferred embodiments, the AMS can also store one or more distribution lists, where the distribution lists can have one or more list attributes. Access can be provided over a network, preferably the Internet, via allowing remote users to access APIs, web pages, applications running on the server, or other forms of interfaces. It is contemplated that an AMS can also be configured to store or manage aliases that can reference the distribution lists.

In some embodiments, at step 815 owners of a distribution list can upload lists to the AMS. Owners can provide their lists through any suitable exchange protocol (e.g., HTTP, FTP, SSH, etc.). Furthermore, the lists can be uploaded using suitable list formats, possibly including CSV files, text, HTML, database schemas, XML, or other format.

Step 820 can include allowing an alias user to submit desirable criteria, including properties of a desirable alias, describing a desirable content distribution chain to support sending messages to a target audience. An AMS can configure an alias user interface to receive desirable criteria using various suitable infrastructures. In some embodiments, the alias user interface can include an API, web page, web service, or other web-base application interface. The alias user interface could also include GUI components to allow a user to submit a selected group of a priori defined criteria. It is also contemplated that a user could submit free form text as a search query.

Step 830 can include identifying that one or more distribution lists having list attributes that satisfy at least some of the desirable criteria. In some embodiments, the AMS searches a database of lists to find one or more a priori defined lists that have list attributes that match or nearly match the criteria. It is also contemplated that distribution lists could be aggregated from existing distribution lists. For example, step 831, can include aggregating at least two distribution lists, possibly owned by different list owners, into a single distribution list where the two lists each have list attributes that satisfy some of the submitted desirable criteria. Another example includes, step 833 which can comprise aggregating a new list from addresses originating from at least two distributions lists, also possibly owned by different owners, where the addresses have address attributes that satisfy at least some of the desirable criteria.

Aggregation of addresses or lists is also considered to include constructing a distribution list based on logical operators applied to existing lists or addresses. A new list can be constructed from intersections, unions, or other configurations of lists, possibly constructed based on the use of logical operators (e.g., AND, NOT, OR, XOR, etc.) used in conjunction with filters based on list or address attributes or other properties.

At step 840 an alias can be provided that points to one or more identified distribution lists and that includes properties of a desirable alias. In some embodiments, the alias can be created by the AMS or other member of the system. It is also contemplated that providing an alias can include creating the alias de novo. Although the step 840 is presented after identifying a distribution list, one should note that the alias could be made available at nearly any time. For example, a list owner could provide an alias they created for their own list, possibly at a time when the list was uploaded to the AMS.

Providing an alias can include multiple operations beyond establishing an alias identifier. Providing the alias can include naming the alias, creating alias attributes, storing the alias in an alias database, providing notifications to interested parties, updating internal AMS records, charging appropriate fees, forming associated data structures, linking an alias with one or more distributions lists, or other activities useful to creating a usable alias.

The provided alias preferably includes one or more alias attributes that satisfy the properties of the submitted criteria. The alias attributes can be distinct from those of other objects within the system including lists, addresses, communication channels or contexts, or other types of objects. For example, an alias pointing to a list might have a price that is different from a purchase price for the distribution list. Other alias attributes could include life time, exclusivity, transferability, salability, alias owner, authentication or authorization criteria (e.g., keys, tokens, passwords, etc.), number of uses, rate of use, alias identifier information, metrics, pointers to other aliases, or other type of alias attributes. It is also contemplated that alias attributes can include user defined attributes, possibly defined by an alias owner or an alias purchaser, having tag-value pairs.

Once an alias has been established to operate as a point of access into a content distribution chain, access to the alias can be offered to the alias user. Providing access to the alias can be performed through many different means. In some embodiments, at step 841, the alias can be offered by presenting a comparison of alias attributes of the alias with respect to the desirable criteria or properties of the desirable alias. At step 843, it is contemplated that in embodiments where more than one alias has been found to meet at least some of a user's submitted desirable criteria, the aliases can be presented as a ranked ordering, possibly ranked according to their alias attributes.

Step 845 further contemplates providing access to the alias in exchange for a fee, where the fee can be established by an auction. The alias user interface can be configured to present various options for an alias user to select, bid, purchase, or otherwise pay for access to one or more aliases.

In some embodiments, step 860 can include establishing an alias management policy that governs usage of one or more aliases based on their alias attributes, preferably satisfying at least some of the submitted desirable criteria. Once a policy is established, an alias user can send a message addressed to the alias in compliance with the policy, preferably by interacting with an AMS. The AMS can cause the message addressed to the alias to be delivered only if in compliance with the alias policy.

Figure 8B:
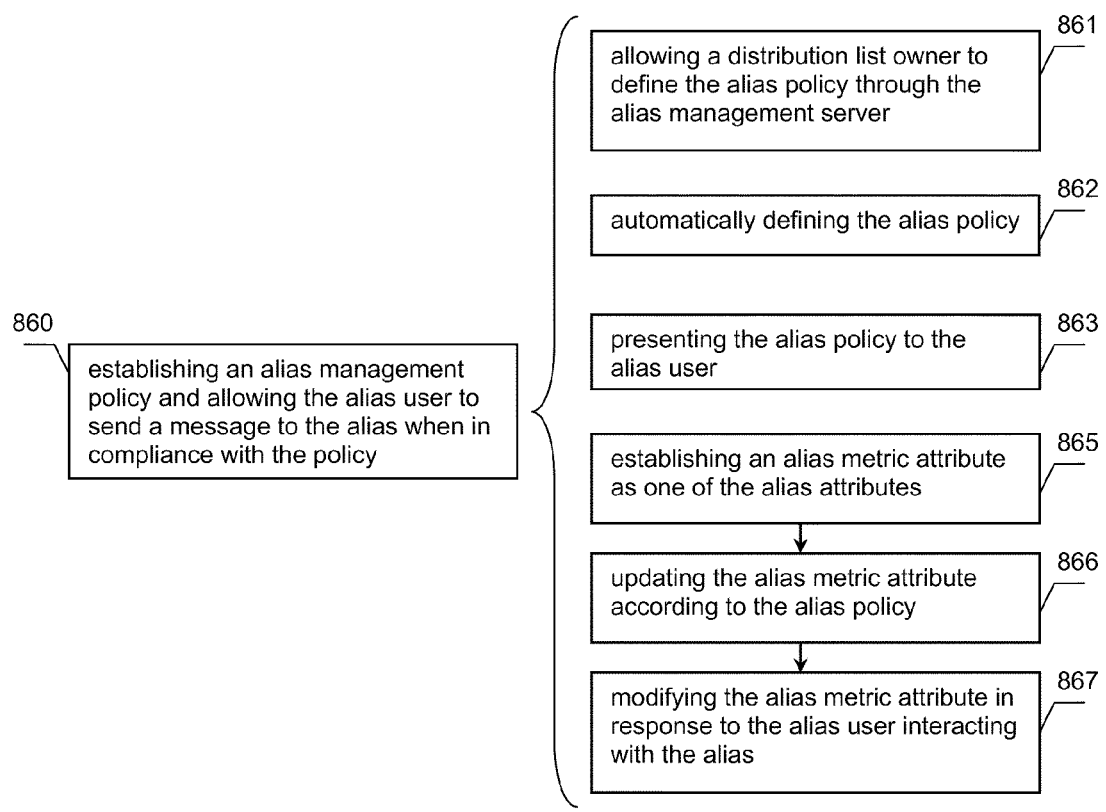
FIG. 8B presents possible additional features regarding establishing alias policies.

FIG. 8B provides additional insights with respect to step 860 of establishing alias management policies. Step 861 can include allowing a distribution list owner, or possibly an address owner, to define the alias management policy through the AMS. At step 862 it is also contemplated that an alias policy can be automatically defined, preferably by the AMS, based on the alias attributes or the desirable criteria. In some embodiments, the AMS defines the alias management policy by compiling rules or conditions of use from distribution lists or from addresses. For example, an alias could inherit rules associated with a distribution list to which the alias points. Additionally, the distribution list could inherit rules from rules bound to addresses within the list. Regardless of how an alias management policy is established, it is also contemplated at step 863 that the policy can be presented to the alias user so that the user can make an informed decisions regarding purchasing access to a corresponding alias. The policy can be presented as a list of governing rules (see FIG. 7B), a license agreement, or other presentation.

At step 865, establishing a policy can include establishing one or more alias metric attributes as an alias attribute. Alias metric attributes provide for measuring one or more aspects of how an alias is used. The metric information can be presented to users (e.g., alias users, alias owners, list owners, etc.) to track, monitor, or otherwise audit use of the alias. Such analysis can be performed on an alias analytics engine possibly incorporated with an AMS. As discussed previously, metrics can include number of uses, rate of uses, flags indicating a user condition has been met, number of accesses, number of failed access, or other metrics. The metrics can be updated according the established policy (step 866), or can be modified in response to the alias user interacting with the alias (step 867).

One should appreciate that an alias management policy can comprise one or more rules relating to alias attributes, including alias metric attributes. Such policies can aid with enforcing such rules as discussed previously when sending a message in compliance to the policy. It is also contemplated that enforcement actions can be taken according the policy rules even under conditions where attributes change with time (e.g., metrics, alias state, ownership, etc.).

An alias management policy can include rules that govern use of the alias, a list, addresses, the AMS, or other objects pertaining to a content distribution chain. Still, one should appreciate that an alias management policy is considered to specifically include rules for governing use of the alias, which can be considered distinct from those governing the other objects. In fact, one aspect of the inventive subject is considered to include the appreciation that aliases can be treated or managed as separate objects within a content distribution chain. Such an appreciation is lacking in the known art.

Returning back to FIG. 8A, at step 870 an AMS causes the message addressed to an alias to be sent to addresses within the distribution list(s) referenced by the alias. The AMS can cause the message through numerous means. For example, the AMS can first authenticate the alias user before allowing the user to utilize a message sending facility. Additionally, at step 871 the AMS can authorize one or more external message servers operating as a sending facility to send the message. Contemplated external message servers include those owned an operated by the alias user, a third party message server or service, or other type of messaging facility external to the AMS. Additionally, at step 873, the AMS can cause the message to be sent in exchange for a fee.

In some embodiments a message is addressed to an alias by including an alias identifier in a destination or "To:" field of a messaging protocol. For example, a message comprising an email could be addressed to an alias of the form "alias_1234567@theAMSservice.com", where the alias address includes an identifier located on an AMS service. In this sense, an alias can be considered to represent an actual addressable address within the addressing namespace of a target communication protocol (e.g., SMTP, instant messaging, VoIP, etc.).

One should note that causing a message to be sent includes restricting use of the alias according to or in compliance with an alias management policy as discussed previously. Such restrictions can be considered to extend beyond allowing the mere use of a messaging protocol or beyond providing message processing capabilities as discussed previously.

Additional Considerations

As briefly discussed above, one aspect of the disclosed inventive subject matter includes the concept of abstracting a distribution list via an alias in a manner where the alias results in a commercial commodity. The alias, as backed by the distribution and due to its validity, can be bought, sold, auctioned, licensed, leased, or otherwise brokered. Furthermore, aliases can be priced based on attributes of the list the aliases reference or other valuable aspects including time, location, news events, or other aspects.

An AMS allows list owners to retain control over their list of addresses without exposing the addresses to others. Such an approach also affords additional revenue opportunities to the AMS or to the list owners. An alias policy can be established that provides rules for incorporating third party content into a message. The third party content can include advertising possibly based on metrics of the policy, alias user identify, list owner, or other properties of the alias or even list attributes. Suitable approaches for incorporating advertising that can be adapted for use in an AMS can be found in U.S. patent application publication 2007/0180039 to Sutidze et al. titled "Anonymous Disposable Email Addressing System and Method of Use Thereo[f]" filed Feb. 1, 2007.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of managing aliases as manageable objects distinct from distribution lists, and where each alias preserves the confidentiality of the addresses within the at least distribution list to which said alias points, the method comprising:

providing access to an alias management server having access to a distribution list database, the alias management server comprising a memory and a processor;

storing in the distribution list database at least one distribution list comprising at least one address of a message recipient and having one or more list attributes;

allowing an alias user who is not a sole message recipient within the at least one distribution list to submit desirable criteria that includes desirable alias properties and desirable list properties to the alias management server;

identifying the at least one distribution list with list attributes that satisfy at least some of the desirable list properties;

providing the alias user access to an alias of an alias object that points to the at least one distribution list, where the alias object satisfies at least some of the submitted desirable alias properties, and where some of the desirable alias properties satisfied by the alias object are distinct from the desirable list properties satisfied by the distribution list;

storing the alias object in the alias management server; and causing a message addressed to the alias to be sent to the addresses within the at least one distribution list.

2. The method of claim 1, further comprising allowing a list owner to upload a list to the alias management server.

3. The method of claim 1, wherein the step of identifying the at least one distribution list includes aggregating at least two distribution lists into a single distribution list, where the two distribution lists each have list attributes that satisfy some of the submitted desirable list properties.

4. The method of claim 1, wherein the step of identifying at least one distribution list includes aggregating a new distribution list from addresses in at least two distribution lists, where the addresses have address attributes that satisfy at least some of the desirable criteria.

5. The method of claim 1, wherein the step of providing the alias includes presenting actual alias attributes associated with the alias object compared to the submitted desirable alias properties.

6. The method of claim 1, wherein the step of providing the alias includes providing the alias in exchange for a fee.

7. The method of claim 6, further comprising auctioning access to the alias to establish the fee.

8. The method of claim 1, wherein the step of causing a message addressed to the alias to be sent to the addresses is performed in exchange for a fee.

9. The method of claim 1, wherein the step of providing the alias includes presenting a ranked ordering of a plurality of aliases that satisfy at least some of the desirable criteria.

10. The method of claim 9, wherein the step of presenting the ranked ordering includes ranking the plurality of the aliases by alias attributes associated with the aliases.

11. The method of claim 1, further comprising establishing an alias management policy governing usage of the alias based on alias attributes associated with the alias that satisfy at least some of the desirable criteria, and causing messages addressed to the alias to be delivered only if in compliance with the alias policy.

12. The method of claim 11, wherein the step of providing the alias includes presenting the alias policy to the alias user.

13. The method of claim 11, wherein the step of establishing the alias policy includes allowing a distribution list owner to define the alias policy.

14. The method of claim 11, wherein the step of establishing the alias policy includes the alias management server automatically defining the alias policy based on the alias attributes and the desirable criteria.

15. The method of claim 11, wherein the step of establishing the alias policy includes establishing an alias metric attribute as one of the alias attributes.

16. The method of claim 15, further comprising updating the alias metric attribute according to the alias policy.

17. The method of claim 16, wherein the step of updating the alias metric attribute includes modifying the alias metric attribute in response to the alias user interacting with the alias.

18. The method of claim 1, wherein the step of causing the message to be sent includes the alias management server authenticating the alias user.

19. The method of claim 1, wherein the step of causing the message to be sent includes the alias management server authorizing an external message server to send the message.

20. The method of claim 19, wherein the external message server comprises an alias user message server authorized by the alias management server.

* * * * *